(12) United States Patent
Holloway et al.

(10) Patent No.: US 9,193,446 B2
(45) Date of Patent: Nov. 24, 2015

(54) BOGIE BEAM ANGLE SENSOR

(71) Applicant: Goodrich Corporation, Charlotte, NC (US)

(72) Inventors: Gary Holloway, Ontario (CA); James Acks, Medina, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 13/963,663

(22) Filed: Aug. 9, 2013

(65) Prior Publication Data

US 2015/0041585 A1 Feb. 12, 2015

(51) Int. Cl.
| | |
|---|---|
| *B64C 25/00* | (2006.01) |
| *G01P 1/04* | (2006.01) |
| *B64C 25/28* | (2006.01) |
| *B64C 25/34* | (2006.01) |
| *B64C 25/58* | (2006.01) |
| *B64D 45/00* | (2006.01) |

(52) U.S. Cl.
CPC .............. *B64C 25/001* (2013.01); *B64C 25/28* (2013.01); *B64C 25/34* (2013.01); *B64C 25/58* (2013.01); *B64D 45/0005* (2013.01); *G01P 1/04* (2013.01)

(58) Field of Classification Search
CPC ...... B64C 25/001; B64C 25/24; B64C 25/26; B64C 2025/345; B64C 25/14; B64C 25/28; B64C 25/34; G01P 1/04
USPC ................................ 244/100 R, 102 R, 102 A
See application file for complete search history.

(56) References Cited

U.S. PATENT DOCUMENTS

| | | | | | |
|---|---|---|---|---|---|
| 2,851,231 | A | * | 9/1958 | Westcott, Jr. | 244/103 R |
| 5,257,756 | A | * | 11/1993 | Patzig et al. | 244/103 R |
| 8,055,396 | B2 | * | 11/2011 | Yates et al. | 701/16 |
| 8,079,548 | B2 | * | 12/2011 | Luce | 244/103 R |
| 2006/0284008 | A1 | * | 12/2006 | Nance | 244/100 R |
| 2007/0023012 | A1 | | 2/2007 | Maemura et al. | |
| 2012/0043417 | A1 | * | 2/2012 | Eriksen et al. | 244/100 R |
| 2012/0211600 | A1 | * | 8/2012 | Mellor | 244/100 R |

FOREIGN PATENT DOCUMENTS

| | | |
|---|---|---|
| EP | 2489591 | 8/2012 |
| GB | 2489058 | 9/2012 |
| WO | WO 2011148158 A1 * | 12/2011 |

OTHER PUBLICATIONS

European Search Report dated Jan. 7, 2015 in European Application No. 14172833.7.

* cited by examiner

*Primary Examiner* — Tien Dinh
*Assistant Examiner* — Christopher Hutchens
(74) *Attorney, Agent, or Firm* — Snell & Wilmer, LLP

(57) ABSTRACT

A bogie beam sensor may include a bracket and a target arm pivotably coupled to the bracket. The bracket may be coupled to a bogie beam. A sensor may be coupled to the bracket, and a target may be coupled to the target arm. A drive link may be coupled to the target arm and a piston. In response to the bogie beam pivoting with respect to the piston, the drive link may cause the target arm to rotate with respect to the bogie beam. The sensor may detect movement of the target on the target arm, and an angular position of the bogie beam may be determined based on the position of the target.

15 Claims, 5 Drawing Sheets

BOGIE BEAM ANGLE SENSOR

FIELD

The present disclosure relates to landing gear, and more particularly, to systems for detecting landing gear positions.

BACKGROUND

Landing gear supports an aircraft while on the ground. Bogie type landing gear may include a bogie beam which supports one or more pairs of wheels. The bogie beam may pivot relative to the landing gear. This may allow certain wheel pairs to touch ground prior to other wheel pairs during landing, and may allow all or a portion of all the wheels to remain on the ground as an aircraft body's center line changes angles with respect to the ground, for example, during takeoff or landing.

It may be desirable to detect the angle of the bogie beam with respect to the landing gear. For example, the bogie beam may be configured to assume a specified position in order for retraction of the landing gear to occur after takeoff. Some landing gear includes a proximity sensor attached to the bogie beam and a target attached to a piston on the landing gear to detect bogie beam position. However, deflection of the bogie beam or piston (e.g., bending under a load) may cause contact between the target and the sensor, and may cause inaccurate readings of bogie beam position.

SUMMARY

As disclosed herein, a bogie beam sensor may comprise a bracket coupled to a bogie beam. A proximity sensor may be coupled to the bracket. A target arm may be pivotably coupled to the bracket, and a target may be coupled to the target arm. A drive link may be coupled to the target arm and a piston. The bogie beam sensor may be configured to detect a change in bogie beam position relative to the piston.

In various embodiments, an aircraft landing gear may comprise a piston and a bogie beam coupled to the piston. The bogie beam may be configured to pivot relative to the piston. A target arm may be coupled to the bogie beam. A sensor may be coupled to the bogie beam. A drive link may be coupled to the piston and the target arm. The drive link may be configured to pivot the target arm with respect to the bogie beam in response to the bogie beam pivoting relative to the piston. The aircraft landing gear may further comprise a target coupled to the target arm.

In various embodiments, an angular motion detection system is disclosed. The angular motion detection system may comprise a first object pivotably coupled to the second object. The first object may comprise a bogie beam, and the second object may comprise a piston. A target and a sensor may be coupled to the first object. A drive link may be coupled to the second object. The drive link may be configured to move the target relative to the sensor in response to the first object rotating with respect to the second object.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems for detecting an angular position of a bogie beam are disclosed. A bogie-type landing gear may comprise a bogie beam. Two or more pairs of wheels may be mounted on the bogie beam. The bogie beam may be pivotably coupled to a piston of the landing gear. It may be desirable to detect small changes in the angular position of the bogie beam. A bogie beam sensor may be coupled to the bogie beam in order to detect changes in angular position of the bogie beam. The bogie beam sensor may comprise a bracket coupled to the bogie beam. A sensor may be coupled to the bracket, and a target may be coupled to a target arm which is pivotably coupled to the bracket. A drive link coupled to the piston may cause the target arm to pivot in response to the bogie beam pivoting with respect to the piston. As both the sensor and target are coupled to the bogie beam, deflections in the bogie beam or piston may not affect the relative positions of the sensor and target.

Figure 1:
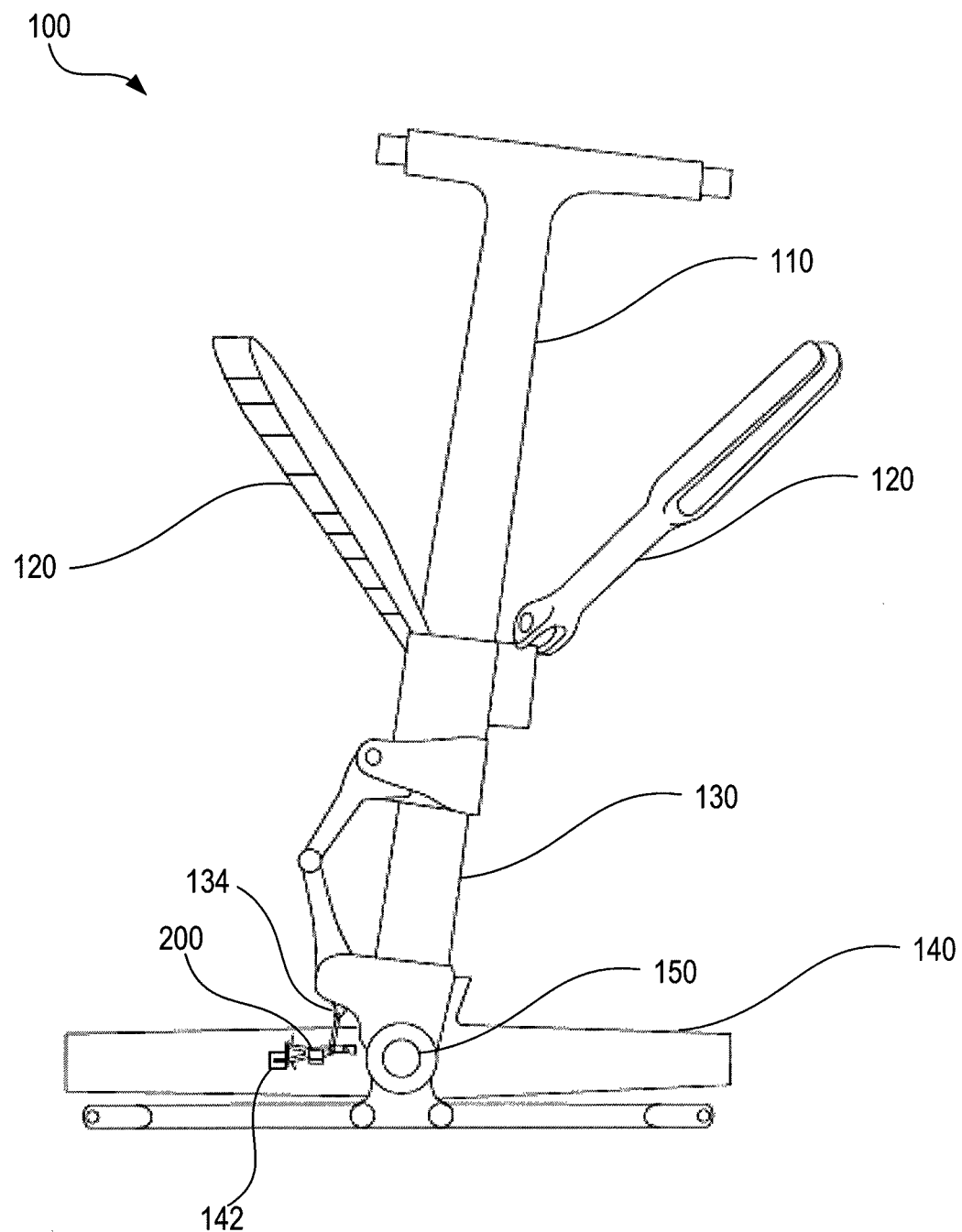
FIG. 1 illustrates, in accordance with various embodiments, a portion of a bogie-type landing gear.

Referring to FIG. 1, a portion of a landing gear 100 is illustrated according to various embodiments. Landing gear 100 may comprise cylinder 110, upper links 120, piston 130, bogie beam 140, pivot 150, and bogie beam sensor 200. Bogie beam sensor 200 may be coupled to piston 130 via piston lug 134, and bogie beam sensor 200 may be coupled to bogie beam 140 via a bogie beam lug 142. As illustrated, bogie beam sensor 200 is located aft of piston 130. However, in various embodiments bogie beam sensor 200 may be located forward of piston 130. Forward, or fore, and aft describe spatial relationships between components, with forward referring to locations relatively closer to the front of an aircraft, and aft referring to locations relatively closer to the rear of an aircraft.

Bogie beam 140 may rotate relative to piston 130 at pivot 150. Bogie beam sensor 200 may detect relative motion between piston 130 and bogie beam 140 and may measure an angle of rotation of bogie beam 140 relative to piston 130. Although described primarily with reference to landing gear, in various embodiments bogie beam sensor 200 may be capable of measuring rotational movement between any type of objects.

Figure 2:
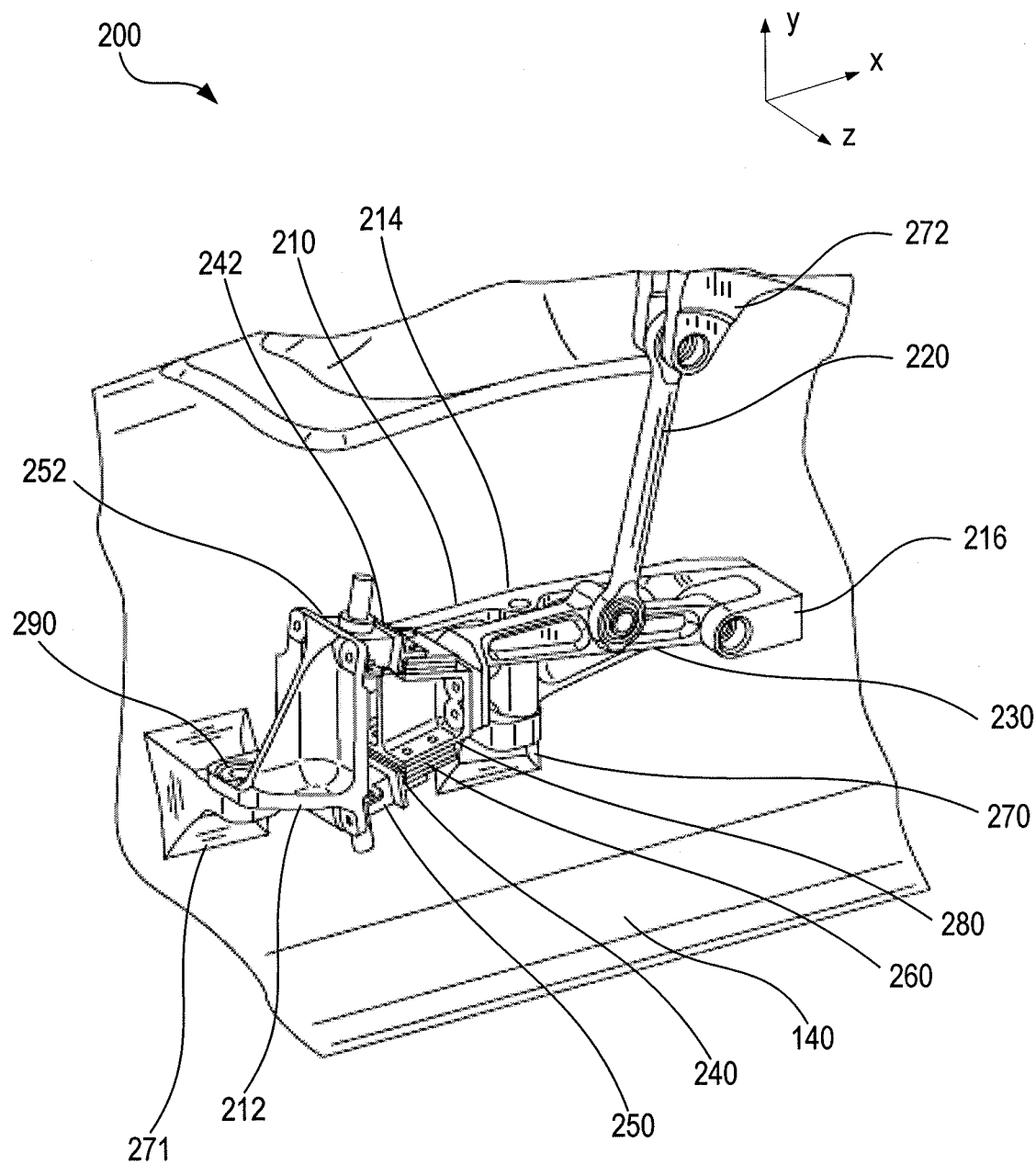
FIG. 2 illustrates, in accordance with various embodiments, a perspective view of a bogie beam sensor.

Referring to FIG. 2, bogie beam sensor 200 is illustrated according to various embodiments. Bogie beam sensor 200 may comprise sensor stroke target bracket 210, drive link 220, target arm 230, nose up target 240, nose down target 242, nose up sensor 250, nose down sensor 252, and shims 260.

Sensor stroke target bracket 210 may comprise sensor bracket 212, bracket arm 214, and bracket elbow 216. In various embodiments, sensor bracket 212, bracket arm 214, and bracket elbow 216 may comprise a single, continuous component. However, in various embodiments, sensor bracket 212, bracket arm 214, and bracket elbow 216 may comprise separate components coupled together. Sensor stroke target bracket 210 may couple bogie beam sensor 200 to bogie beam 140 via forward bogie lug 270 and aft bogie lug 271. In various embodiments, at least two bogie lugs 270, 271 may couple bogie beam sensor 200 to bogie beam 140. Multiple bogie lugs may prevent sensor stroke target bracket 210 from moving relative to bogie beam 140. In various embodiments, sensor stroke target bracket 210 may comprise aluminum. However, in various embodiments, sensor stroke target bracket 210 may comprise any other material, such as steel or a carbon composite or any other suitable material.

Drive link 220 may be coupled to piston lug 272 and target arm 230. In response to bogie beam 140 moving relative to piston 130, drive link 220 may cause target arm 230 to pivot in the y-direction about bracket elbow 216 relative to bogie 140. X, y, and z axes are shown for ease of illustration. In various embodiments, drive link 220 may comprise stainless steel. However, in various embodiments, drive link 220 may comprise aluminum, a carbon composite, or any other suitable material.

Target arm 230 may be coupled to bracket elbow 216. Target arm 230 may also be coupled to target bracket 280. Drive link 220 may be configured to cause target arm 230 to pivot at bracket elbow 216. In response to target arm 230 pivoting at bracket elbow 216, target bracket 280 may move in the y-direction relative to sensor bracket 212. In various embodiments, target arm 230 may comprise stainless steel. However, in various embodiments, target arm 230 may comprise aluminum, a carbon composite, or any other suitable material.

Target bracket 280 may be coupled to target arm 230, nose up target 240, and nose down target 242. Shims 260 may be located between nose up target 240, nose down target 242, and target bracket 280. Adjustments to the location of nose up target 240 and nose down target 242 may be made by adding or removing one or more shims 260, or by changing the size of shims 260. In various embodiments, nose up target 240 and nose down target 242 may be located 0.08 inches (0.20 cm) from nose up sensor 250 and nose down sensor 252 respectively. However, in various embodiments, nose up target 240 and nose down target 242 may be located between 0.07 -0.09 inches (0.18-0.23 cm) or 0.04-0.16 inches (0.10-0.40 cm) from nose up sensor 250 and nose down sensor 252, respectively.

Nose up sensor 250 and nose down sensor 252 may be coupled to sensor bracket 212. In various embodiments, nose up sensor 250 and nose down sensor 252 may comprise proximity sensors. Nose up sensor 250 and nose down sensor 252 may transmit a signal to nose up target 240 and/or nose down target 242. The signals may be reflected off nose up target 240 and nose down target 242. Nose up sensor 250 and nose down sensor 252 may receive the reflected signals and detect a position of nose up target 240 and nose down target 242. Based on the reflected signals, a position of bogie beam 140 may be determined. In various embodiments, proximity sensors such as nose up sensor 250 and nose down sensor 252 may use a variable inductance mode of operation where a change of inductance is measured. The proximity sensors may comprise an inductor which produces an electromagnetic field. As a ferromagnetic target approaches the sensor, the inductance may increase and may be detected by a versatile sensor interface module.

Figure 3:
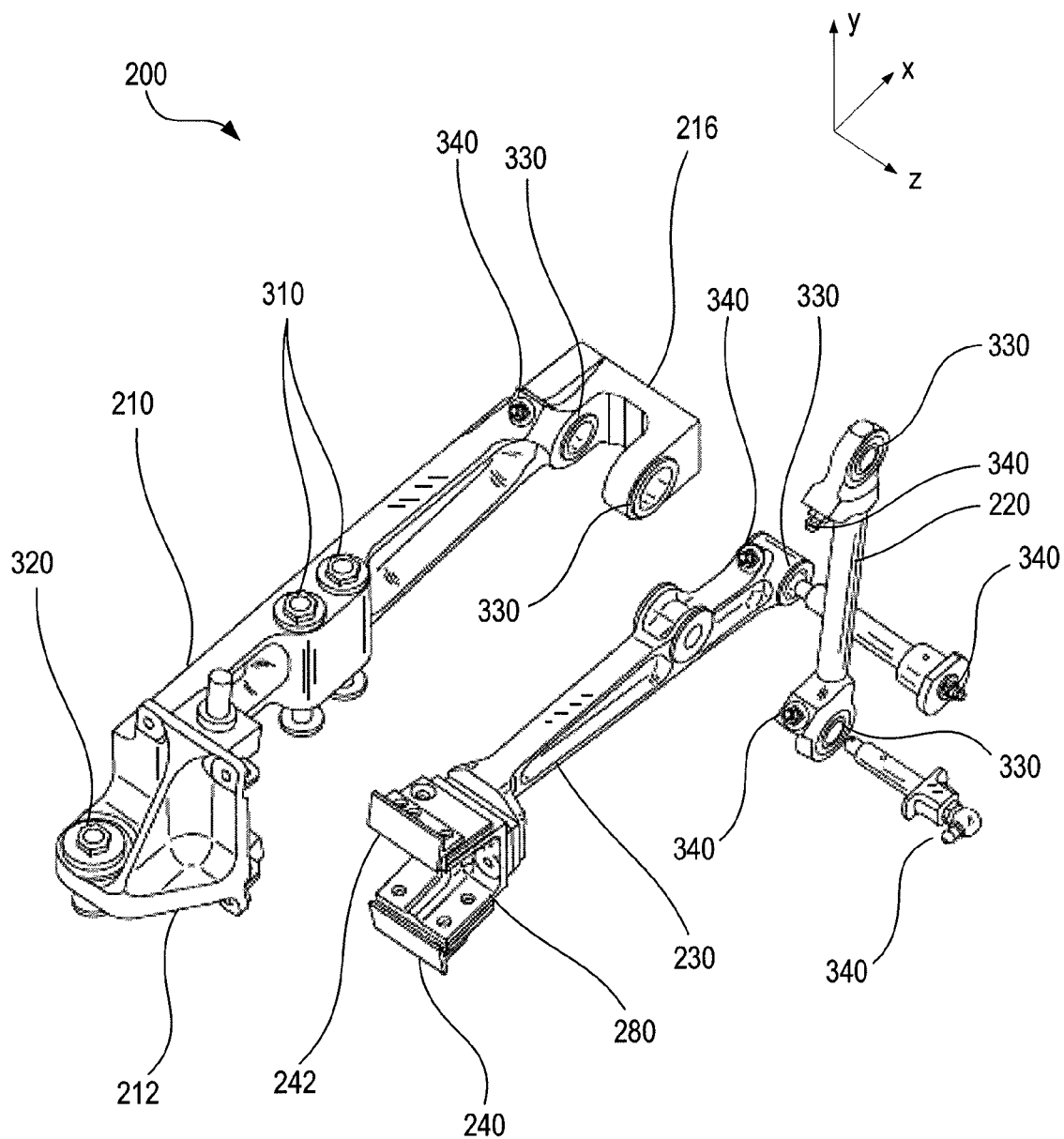
FIG. 3 illustrates, in accordance with various embodiments, an exploded view of a bogie beam sensor.

In various embodiments, and with momentary reference to FIGS. 2 and 3, a distance between forward bogie lug 270 and aft bogie lug 271 may change slightly due to deflection from bogie beam 140 or piston 130. Deflection may be a bending of bogie beam 140 due to a strain, such as weight from an aircraft on landing gear 100. In various embodiments sensor bracket 212 may be coupled to bogie beam 140 via a sliding joint 290. Sliding joint 290 may comprise an elongated opening, or an opening with a larger radius than sensor bracket bolt 320, which may allow sensor stroke target bracket 210 to move forward and aft in the x-direction with respect to sensor bracket bolt 320. Movement of sensor bracket bolt 320 within sliding joint 290 may prevent strain on sensor stroke target bracket 210 due to deflection of bogie beam 140.

Referring to FIG. 3, a partially exploded view of bogie beam sensor 200 is illustrated according to various embodiments. In various embodiments, bracket arm bolts 310 and sensor bracket bolt 320 may couple sensor stroke target bracket 210 to bogie beam 140. Sensor stroke target bracket 210 further comprises bearings 330. In various embodiments, bearings 330 in drive link 220 may comprise spherical bearings. Spherical bearings may allow for slight horizontal rotation of components in the z-direction. In various embodiments, bogie beam 140 may turn in the z-direction relative to piston 130. Spherical bearings may prevent strain between drive link 220 and target arm 230, and between target arm 230 and bracket elbow 216. Bogie beam sensor 200 may further comprise lubrication ports 340. Lubrication ports 340 may allow lubrication, such as oil or grease, to be added to the moving components of bogie beam sensor 200 to prevent wear on the moving components.

In various embodiments, nose up target 240 and nose down target 242 may be non-parallel. Nose up target 240 and nose down target 242 may each be perpendicular to bracket elbow 216. However, due to the different location of nose up target 240 and nose down target 242 on target bracket 280, nose up target 240 and nose down target 242 may be non-parallel to each other. This may allow for greater sensitivity between the targets and sensors.

Figure 4A:
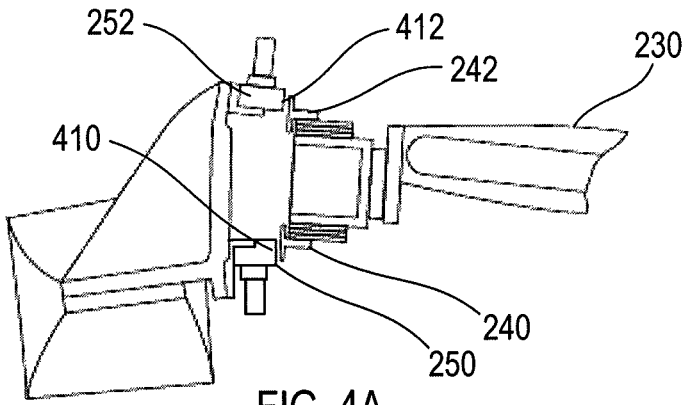
FIG. 4A illustrates, in accordance with various embodiments, a target arm in a neutral position.
Figure 4B:
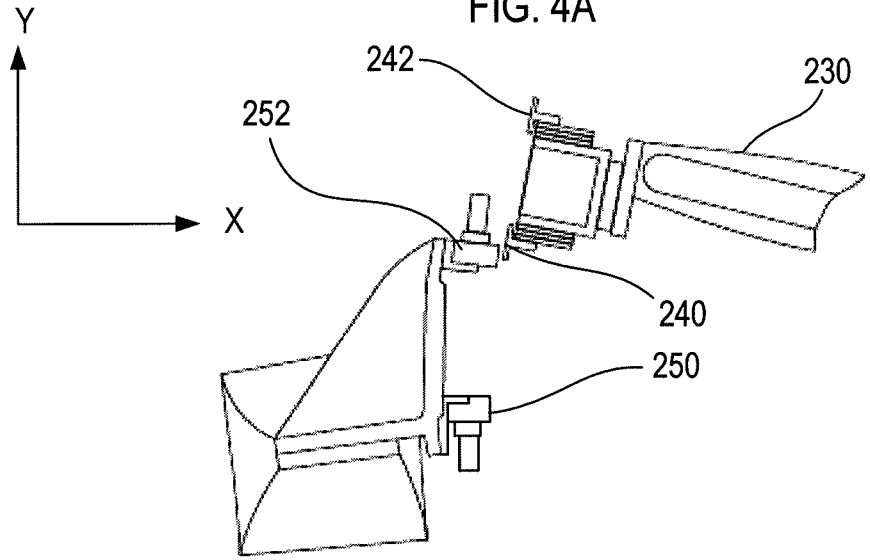
FIG. 4B illustrates, in accordance with various embodiments, a target arm in a nose up position.
Figure 4C:
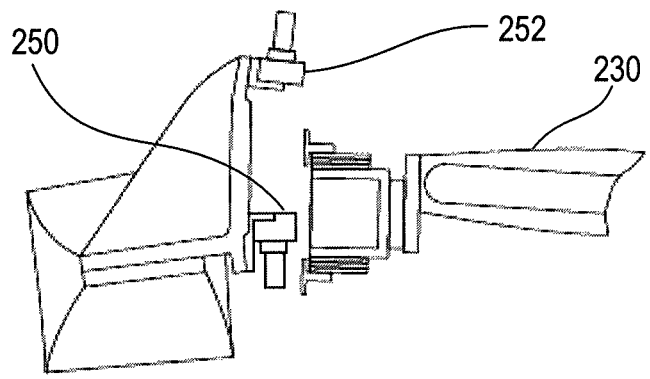
FIG. 4C illustrates, in accordance with various embodiments, a target arm in a nose down position.

Referring to FIGS. 4A-4C, various positions of target arm 230 are illustrated according to various embodiments. In FIG. 4A, target arm 230 is illustrated in a neutral position. In various embodiments, the neutral position may be when an aircraft is stationary on the ground. However, in various embodiments, the neutral position may be when the aircraft is in air and landing gear 100 is hanging in the air. In various embodiments, the neutral position may be a position in which landing gear 100 may be retracted into an aircraft. In the neutral position, nose up target 240 may be aligned with nose up sensor 250, and nose down target 242 may be aligned with nose down sensor 252, such that nose up sensor 250 and nose down sensor 252 each receive a signal from nose up target 240 and nose down target 242 respectively.

In various embodiments, nose up target 240 and nose down target 242 may be biased with respect to nose up sensor 250 and nose down sensor 252. For example, nose up target 240 may be slightly offset in the y-direction with respect to nose up sensor 250. As illustrated in the neutral position in FIG. 4A, nose up target 240 is located above a center point 410 of nose up sensor 250. In response to small changes in position of nose up target 240, the change in signal detected by nose up sensor 250 may be greater with increasing distance from center point 410. Thus, in response to bogie beam 140 tilting slightly toward the nose up position, both nose up target 240 and nose down target 242 may move upward by the same distance relative to nose up sensor 250 and nose down sensor 252. However, due to the bias, nose up sensor 250 may detect a greater signal change than nose down sensor 252, because nose up target 240 moves away from center point 410 and nose down target 242 moves toward center point 412 of nose down sensor 252. Thus, the bias may allow for more accurate measurements of small changes in a position of bogie beam 140.

Referring to FIG. 4B, target arm 230 is illustrated in a nose up position. In the illustrated position, nose up target 240 and nose down target 242 may be out of range of nose up sensor 250 and nose down sensor 252. In response to the targets being out of range of the sensors, the sensors may determine that an angular position of bogie beam 140 is greater than a maximum range of bogie beam sensor 200.

Referring to FIG. 4C, target arm 230 is illustrated in a nose down position. Depending on the specifications of the targets and sensors, target arm 230 may be at a maximum range of nose up sensor 250 and nose down sensor 252. In response to target arm 230 moving beyond the maximum range in the y-direction, nose up sensor 250 and/or nose down sensor 252 may not receive a position reading from nose up target 240 and/or nose down target 242. In various embodiments, the maximum range may equate to a change in position of bogie beam 140 of less than or equal to +/−1.1 degrees with respect to piston 130. However, in various embodiments, the maximum range may be between +/−0.5 degrees and +/−2 degrees, or between +/−0.2 degrees and +/−5 degrees. In various embodiments, a +/−1.1 degree rotation of bogie beam 140 may translate to 0.875 inches (2.2 cm) of relative movement between nose up target 240 and nose up sensor 250.

Figure 5:
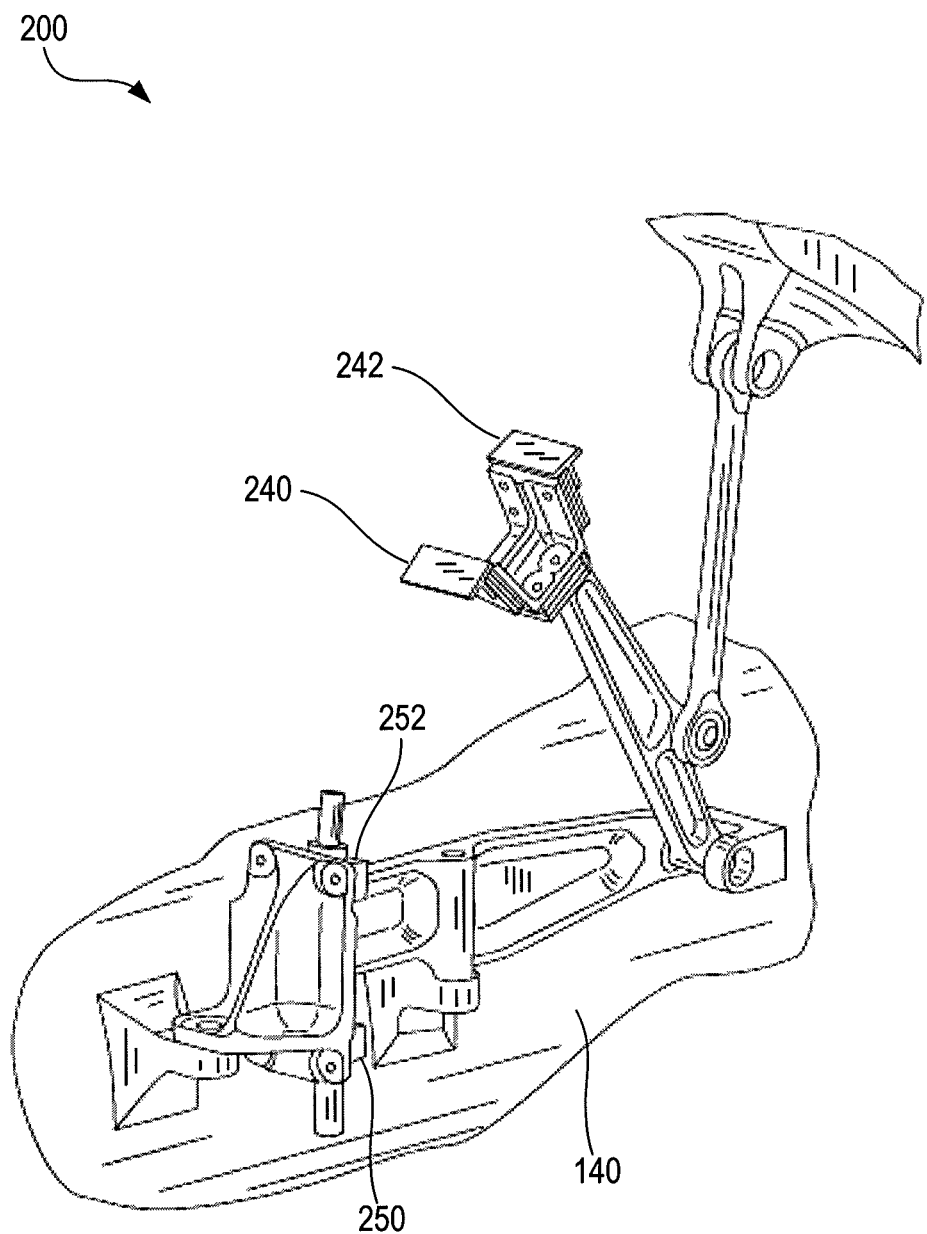
FIG. 5 illustrates, in accordance with various embodiments, a bogie beam sensor in a maximum nose up position.

Referring to FIG. 5, bogie beam sensor 200 is illustrated in a maximum nose up position. In the maximum nose up position, bogie beam 140 may be angled at a maximum nose up angle relative to piston 130. Nose up target 240 and nose down target 242 may be out of range of nose up sensor 250 and nose down sensor 252.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A bogie beam sensor comprising:
    a bracket non-rotatably coupled to a bogie beam;
    a sensor coupled to the bracket, wherein the sensor is configured to detect an angular position of the bogie beam relative to a piston;
    a target arm coupled to the bracket;
    a target coupled to the target arm; and
    a drive link, wherein the drive link is coupled to the target arm and wherein the drive link is coupled to the piston.

2. The bogie beam sensor of claim 1, wherein the target arm is configured to pivot relative to the bracket.

3. The bogie beam sensor of claim 1, wherein the sensor comprises a proximity sensor.

4. The bogie beam sensor of claim 1, wherein the bracket is coupled to the bogie beam via a forward lug and an aft lug.

5. The bogie beam sensor of claim 4, wherein the aft lug comprises a sliding joint.

6. The bogie beam sensor of claim 1, wherein the drive link comprises a spherical bearing.

7. The bogie beam sensor of claim 1, wherein the target comprises a nose up target and a nose down target.

8. The bogie beam sensor of claim 7, wherein the nose up target and the nose down target are non-parallel.

9. The bogie beam sensor of claim 1, wherein the target is offset relative to the sensor in a neutral position.

10. The bogie beam sensor of claim 1, wherein the bogie beam sensor in configured to detect a change in a bogie beam position of less than or equal to +/− 1.1 degrees.

11. An aircraft landing gear comprising;
a piston;
a bogie beam coupled to the piston, wherein the bogie beam is configured to pivot relative to the piston;
a target arm pivotably coupled to a bracket, wherein the bracket is non-rotatably coupled to the bogie beam;
a sensor coupled to the bogie beam, wherein the sensor is configured to detect an angular position of the bogie beam relative to a piston; and
a drive link coupled to the piston and the target arm.

12. The aircraft landing gear of claim 11, wherein the drive link is configured to pivot the target arm with respect to the bogie beam in response to the bogie beam pivoting relative to the piston.

13. The aircraft landing gear of claim 11, further comprising a target coupled to the target arm.

14. The aircraft landing gear of claim 11, wherein the sensor is configured to detect a rotation of the bogie beam. of less than or equal to 1.1 degrees.

15. The aircraft landing gear of claim 11, wherein the drive link is coupled to the target arm via a spherical bearing.

\* \* \* \* \*